United States Patent Office 3,829,437
Patented Aug. 13, 1974

3,829,437
SUBSTITUTED-PHENYL-N-ALKYL-N-THRIHALO-
METHYLTHIO-CARBAMATES
Gerhard Zumach, Cologne, Engelbert Kühle, Bergisch
Gladbach, and Wolfgang Behrenz and Ingeborg Hammann, Cologne, Germany, assignors to Bayer Aktiengesellschaft, Leverkusen, Germany
No Drawing. Filed Mar. 14, 1972, Ser. No. 234,663
Claims priority, application Germany, Mar. 19, 1971,
P 21 13 454.3
Int. Cl. C07d *13/04, 71/00*
U.S. Cl. 260—327 M                               8 Claims

ABSTRACT OF THE DISCLOSURE

Substituted - phenyl-N-alkyl-N-trihalomethylthio-carbamates of the general formula

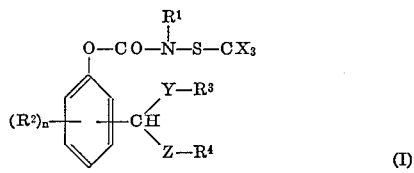

(I)

in which

X is chlorine, fluorine or bromine,
$n$ is 0, 1 or 2,
$R^1$ is lower alkyl,
$R^2$ is lower alkyl or alkoxy, halogen or nitro,
Y and Z each independently is oxygen or sulfur, and
$R^3$ and $R^4$ each independently is lower alkyl, alkenyl
  or alkynyl, or together are an alkylene radical completing a 5- to 7-membered saturated heterocyclic ring
  optionally substituted by at least one of lower alkyl or
  alkoxy radicals, halogen and nitro, which possess insecticidal, acaricidal and fungicidal properties.

---

The present invention relates to and has for its objects the provision of particular new substituted-phenyl-N-alkyl-N-trihalomethylthio-carbamates, e.g. o-(1,3-dioxolan - 2 - yl)-phenyl-N-methyl-N-trihalomethylthio-carbamates, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, with other and further objects becoming apparent from a study of the within specification and accompanying examples.

It is known from German Published Specification DOS 1,518,675 that o - (1,3 - dioxolan - 2 - yl)-phenyl-N-methylcarbamate (Compound A) possesses insecticidal activity.

The present invention provides N-sulfenylated carbamates of the general formula:

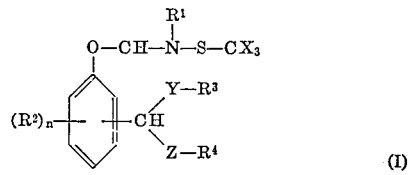

(I)

in which

X is chlorine, fluorine or bromine,
$n$ is 0, 1 or 2,
$R^1$ is lower alkyl,
$R^2$ is lower alkyl or alkoxy, halogen or nitro, Y and Z each independently is oxygen or sulfur, and
$R^3$ and $R^4$ each independently is lower alkyl, alkenyl
  or alkynyl, or together are an alkylene radical completing a 5- to 7-membered saturated heterocyclic ring
  optionally substituted by at least one of lower alkyl or
  alkoxy radicals, halogen and nitro.

These compounds have been found to have strong insecticidal, acaricidal and fungicidal effectiveness. It is very surprising that the compounds according to the invention show a higher insecticidal, acaricidal and fungicidal potency than the previously known o-(1,3-dioxolan-2-yl)-phenyl-N-methylcarbamate. The substances according to the invention therefore represent an enrichment of the art.

Preferably, X is chlorine or fluorine; Y is oxygen; $R^1$ is methyl; $R^2$ is methyl, methoxy, chlorine, bromine or nitro; $n$ is 0 or 1; and $R^3$ and $R^4$ together are an ethylene, propylene or isopropylene radical, which is linked, as illustrated, to the o-position of the phenyl ring.

The invention also provides a process for the production of a sulfenylated carbamate of the general formula (I) in which a N-sulfenylated carbamic acid fluoride of the general formula:

(II)

is reacted with a phenol of the general formula:

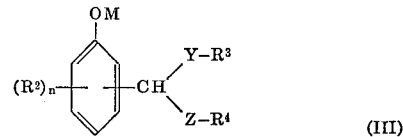

(III)

in the presence of an acid acceptor if M is hydrogen, and optionally in the presence of a diluent; in the above-mentioned formulae, $R^1$, $R^2$, $R^3$, $R^4$, X, Y, Z and $n$ have the meanings indicated above and M is hydrogen or an alkali metal.

If o-(1,3-dioxolan-2-yl)-phenol and N-(fluorodichloromethylthio)-N-methylcarbamic acid fluoride are used as the starting substances, the course of the reaction can be represented by the following equation:

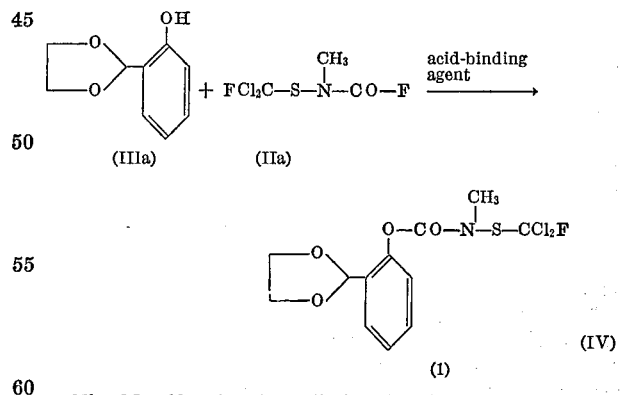

The N-sulfenylated N-alkyl-carbamic acid fluorides to be used for the reaction are known and are obtainable from N-alkylcarbamic acid fluorides and the appropriate sulfenyl chlorides, which are also known, in the presence of a tertiary amine as described in Belgian Patent Specification 717,705.

The phenols (III) to be used for the reaction are in part known and are open-chain cyclic acetals and mercaptals, the radicals $R^4$ and $R^5$ being determined by the monofunctional or polyfunctional alcohols and mercaptans employed in the manufacture of the phenols and identified in more detail below.

The phenols may be made in accordance with known methods, by reaction of hydroxybenzaldehydes or the corresponding aldehyde derivatives, e.g. acetals, oximes, and the like, with lower alcohols or mercaptans in the presence of acid catalysts such as zinc chloride, mineral acids, *p*-toluenesulfonic acid and the like. Other acetalizing agents, for example orthoformic acid esters of forminio-ethers, can also be used for the acetalization, and orthothioborates can, for example, be employed for the mercaptalization. The stoichiometric ratio of the starting products and the functionality of the alcohols or mercapans decide whether open-chain or cyclic acetals or mercaptals are produced.

If the reaction is carried out in two stages, mixed acetals, mercaptals or monothioacetals can be obtained if different alcohols and mercaptans are used.

A further possibility for the preparation of the phenols (III) is the reaction of the corresponding hydroxybenzal chlorides with alcoholates or mercaptides.

As examples of suitable alcohols and mercaptans for the preparation of the phenols there may be mentioned: methanol, ethanol, propanol, isopropanol, 1-butanol, 2-butanol, 2-methyl-1-propanol, allyl alcohol, propargyl alcohol, 2-chloroethanol, 2-bromoethanol, methylmercaptan, ethylmercaptan, n-propylmercaptan, isopropylmercaptan, n-butyl-mercaptan, allylmercaptan, propargylmercaptan, ethylene glycol monomethyl ether, ethylene glycol monoethyl ether, ethylene glycol monopropyl ether, ethylene glycol monoisopropyl ether, 3-methoxy-1-propanol, 3-ethoxy-1-propanol, 3-methoxy-2-propanol, 2-methoxy-1-propanol, 3-methoxy-1-butanol, 3-methoxy-2-butanol, 2-methylmercapto-ethanol, 2-ethylmercapto-ethanol, 2-isopropylmercapto-ethanol, 2-methoxy-ethylmercaptan, 2-ethoxyethylmercaptan, 2-isopropoxy-ethylmercaptan, 2-methylmercaptoethylmercaptan, 2 - ethylmercapto-ethylmercaptan, ethylene glycol, 1,2-propanediol, 3-fluoro-1,2-propanediol, 3-chloro-1,2-propanediol, 3-bromo-1,2-propanediol, 3-methoxy-1,2-propanediol, 3-ethoxy-1,2-propanediol, 3-isopropoxy-1,2-propanediol, 3-allyloxy-1,2-propanediol, 3-methallyloxy-1,2-propanediol, 3-propargyloxy-1,2-propaneidol, 3-acetoxy-1,2-propanediol, 3-methylmercapto-1,2-propanediol, glycerine, 1,3-propanediol, 2-nitro-1,3-propanediol, 1,2-butanediol, 1,3-butanediol, 1,4-butanediol, 2,3-butanediol, 2-methyl-1,2-propanediol, 3-chloro-2-chloromethyl-1,2-propanediol, 2-methyl-1,3-propanediol, 2-nitro-2-methyl-1,3-propanediol, 1,2-pentanediol, 1,3-pentanediol, 2,3-pentanediol, 2,4-pentanediol, 2-methyl-1,2-butanediol, 2-methyl-1,3-butanediol, 2-methyl-2,3 - butanediol, 2 - methyl-2,4-butanediol, 2-methyl-3,4-butanediol, 2-ethyl-1,3-propanediol, 1,4-dichloro-2-methyl-2,3-butanediol, 4-bromo-2-methyl-2,3-butanediol, 2,2-dimethyl-1,3-propanediol, 2,4-hexanediol, 2-methyl-2,3-pentanediol, 3-methyl-2,4-pentanediol, 2,2-dimethyl-3,4-butanediol, 2-ethanol-1-thiol, 2-propanol-1-thiol, 3-chloro-2-propanol-1-thiol, 3-propanol-1-thiol, ethanedithiol, 1,2-propanedithiol, 1,3-propanedithiol, 1,2-butanedithiol, 2,3-butanedithiol, 2,2-dimethyl-1,3-propanedithiol, and the like. Ethylene glycol, 1,3-propanediol, 1,2-propanediol and 2-ethanol-1-thiol are preferentially used.

The aromatic aldehydes required for the manufacture of the phenols of the formula (III) by the method of acetalization or mercaptalization are in part known and can be manufactured according to known methods, e.g. Houben-Weyl, Methoden der Organ. Chemie (Methods of Organic Chemistry), Volume 7, Part 1, Stuttgart, 1954.

As examples of such aldehydes there may be mentioned:

salicylaldehyde, 4-methyl-salicylaldehyde, 5-methyl-salicylaldehyde, 4-methoxy-salicylaldehyde, 5-methoxy-salicylaldehyde, 4-isopropoxy-salicylaldehyde, 4-chloro-salicylaldehyde, 5-chloro-salicylaldehyde, 5-bromo-salicylaldehyde, 4-nitro-salicylaldehyde, 5-bromo-salicylaldehyde, 3,5 - dichloro - salicylaldehyde, 3,5-dibromo-salicylaldehyde, 3,5-dinitro-salicylaldehyde, 3-hydroxy-benzaldehyde, 3-hydroxy-4-methyl-benzaldehyde, 3-hydroxy-5-methyl - benzaldehyde, 3 - hydroxy-6-methyl-benzaldehyde, 2-chloro-3-hydroxy-benzaldehyde, 4-chloro-3-hydroxy-benzaldehyde, 6-chloro-3-hydroxy-benzaldehyde, 6 - bromo - 3 - hydroxy-benzaldehyde, 3 - hydroxy-4-methoxybenzaldehyde, 4-hydroxy-benzaldehyde, 4-hydroxy-2-methyl - benzaldehyde, 4 - hydroxy-3-methyl-benzaldehyde, 4-hydroxy-3-methoxy-benzaldehyde, 2-chloro-4-hydroxy-benzaldehyde, and the like. Salicyladehyde is preferentially used.

The reaction according to the invention for the production of the new N-sulfenylated carbamates is preferably carried out in the presence of a solvent, which term includes a mere diluent. When working with solvents, those which do not react with the N-sulfenylated N-alkylcarbamic acid fluorides, or only react slowly with them, are preferably used. As examples of such solvents there may be mentioned optionally chlorinated hydrocarbons, such as benzene, toluene, methylene chloride, dichloroethane, chloroform, chlorobenzene and dichlorobenzene; ethers, such as diethyl ether, tetrahydrofuran and dioxane; and mixtures of these solvents. Dioxane is preferably used.

In order to bind the hydrogen fluoride produced in the reaction, and acid acceptor, preferably a tertiary base such as triethylamine, or an inorganic base such as an alkali metal hydroxide or alkali metal carbonate, is added to the reaction mixture. It is also possible to start directly from the appropriate alkali metal phenolate and to carry out the reaction in the aqueous phase.

The reaction temperatures can be varied over a wide range. In general the reaction is carried out at about 0 to 100° C., preferably at about 20 to 40° C.

The reactants are usually employed in equimolar ratios.

The active compounds according to the invention are new and exhibit, with low phytotoxicity, strong insecticidal and acaricidal properties. The active compounds can therefore be used with good results for the control of noxious sucking and biting insects, Diptera and mites (*Acarina*). The compounds additionally exhibit a strong fungicidal activity, in particular against soil-borne and seed-borne plant diseases.

For this reason, the new compounds may be used in the crop protection field as well as in the hygiene field, as insecticides, acaricides and fungicides.

To the sucking insects contemplated herein there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kühniella*) and greater wax moth (*Galleria mellonella*); and the like.

Also to be classed with the biting insects contemplated herein are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta;* further, *Orthoptera,* for example the house cricket (*Acheta domesticus*); termites such as the eastern subterranean termite (*Reticulitermes flavipes*) and *Hymenoptera* such as ants, for example the garden ant (*Lasius niger*); and the like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*) the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (*Acari*) contemplated herein there are classed, in particular, the spider mites (*Tetranychidae*) such as the two-spotted spider mite (*Tetranychus telarius=Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), paraffins (e.g. petroleum or mineral oil fractions), cycloaliphatic hydrocarbons (e.g. cyclohexane), chlorinated aliphatic hydrocarbons (e.g. methylene chloride, chloroethylenes, etc.), alcohols (e.g. methanol, ethanol, propanol, butanol, glycol, etc.), amines (e.g. ethanolamine, etc.), ethers or esters of such alcohols, ether-alcohols (e.g. glycol monomethyl ether, etc.), methyl ethyl ketone, methyl isobutyl ketone, cyclohexanone, strongly polar solvents such as amides (e.g. dimethyl formamide, etc.), sulfoxides (e.g. dimethyl sulfoxide, etc.), acetonitrile, and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, rodenticides and fungicides, or bactericides, nematocides, herbicides, fertilizers, growth-regulating agents, etc., if desired, or in the form of particular dosage preparation for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or filed application generally contemplate those in which the active compound is present in an amount substantially between about 0.0005–20%, preferably 0.005–5% by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and fungi, which comprises applying to at least one of correspondingly (a) such insects, (b) such acarids, (c) such fungi, and (d) the corresponding habitat thereof, i.e. the locus to be protected, a correspondingly combative or toxic amount, i.e. an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

$LD_{100}$ test

Test insects: *Acheta domesticus* (female)
Solvent: acetone.

2 parts by weight of the active compound are dissolved ni 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 15 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 1:

TABLE 1
$LD_{100}$ test

| Active compounds | Percent Concentration of active compound of the solution | Destruction |
|---|---|---|
| (1) ... O—CO—N—S—CCl$_2$F, CH$_3$ | 0.2<br>0.04 | 100<br>100 |
| (3) ... O—CO—N—S—CF$_3$, CH$_3$ | 0.2<br>0.04<br>0.008 | 100<br>100<br>100 |

TABLE 1—Continued
$LD_{100}$ test

| Active compounds | Percent Concentration of active compound of the solution | Destruction |
|---|---|---|
| (2) ... O—CO—N—S—CCl$_3$, CH$_3$ | 0.2 | 100 |
| (5) ... CH$_3$— O—CO—N—S—CCl$_2$F, CH$_3$ | 0.2 | 100 |
| (A) ... O—CO—NH, CH$_3$ (known) | 0.2 | 40 |

EXAMPLE 2

$LD_{100}$ test

Test insects: *Ornithodorus moubata* 3rd–4th nymphal stage
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 15 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 2:

TABLE 2
$LD_{100}$ test

| Active compounds | Percent Concentration of active compound of the solution | Destruction |
|---|---|---|
| (1) ... O—CO—N—S—CCl$_2$F, CH$_3$ | 0.2<br>0.04 | 100<br>80 |
| Comparative agent: |  |  |
| (A) ... O—CO—NHCH$_3$ (known) | 0.2 | 20 |

EXAMPLE 3

LT₁₀₀ test

Test insects: *Lasioderma serricorne*
Solvent acetone.

2 parts by weight of active compound are dissolved in 1000 parts by volume of solvent. The solution so obtained is diluted with further solvent to the desired lower concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed for up to 72 hours. The time which is necessary for a 100% destruction is determined.

The test insects, the active compounds, the concentrations of the active compounds and the periods of time at which there is a 100% destruction can be seen from the following Table 3:

TABLE 3
LT₁₀₀ test

| Active compounds | Concentration of active compound of the solution in percent | LT₁₀₀ |
|---|---|---|
| (2) 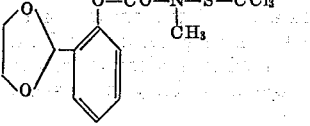 O—CO—N—S—CCl₃ / CH₃ | 0.2 / 0.04 / 0.008 / 0.0016 | 4ʰ / 24ʰ / 72ʰ / 72ʰ |
| (1) 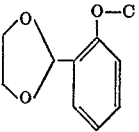 O—CO—N—S—CCl₂F / CH₃ | 0.2 / 0.04 / 0.008 | 120' / 180' / 72ʰ |
| (3) 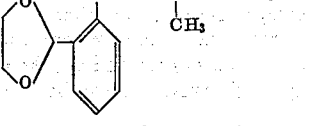 O—CO—N—S—CF₃ / CH₃ | 0.2 / 0.04 | 30' / 120' |
| (5) CH₃— 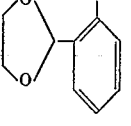 O—CO—N—S—CCl₂F / CH₃ | 0.2 / 0.04 | 120' / 24ʰ |
| (4) CH₃— 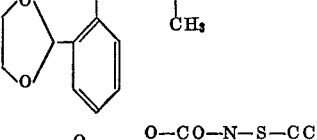 O—CO—N—S—CCl₃ / CH₃ | 0.2 / 0.04 | 6ʰ / 72ʰ |
| 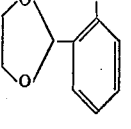 O—CO—N—H / CH₃ (known) | 0.2 | 24ʰ |

EXAMPLE 4

LD₁₀₀ test

Test insects: *Dermestes peruvianus* larvae
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 15 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 4:

TABLE 4
LD₁₀₀ test

| Active compounds | Percent Concentration active compound of the solution | Destruction |
|---|---|---|
| (2) 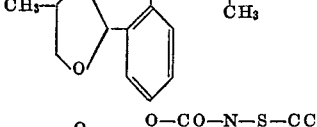 O—CO—N—S—CCl₃ / CH₃ | 0.2 / 0.04 | 100 / 100 |
| (1) 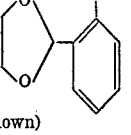 O—CO—N—S—CCl₂F / CH₃ | 0.2 / 0.04 | 100 / 100 |
| (3) 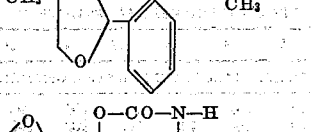 O—CO—N—S—CF₃ / CH₃ | 0.2 / 0.04 | 100 / 100 |
| (A) O—CO—NH / CH₃ (known) | 0.2 / 0.04 | 100 / 0 |

EXAMPLE 5

LD₁₀₀ test

Test insects: *Dermestes peruvianus*
Solvent: acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed 3 days after the commencement of the experiments. The destruction is determined as a percentage.

The active compounds, the concentrations of the active compounds, the test insects and the results can be seen from the following Table 5:

TABLE 5
LD₁₀₀ test

| Active compounds | Percent Concentration of active compound of the solution | Destruction |
|---|---|---|
| (1) 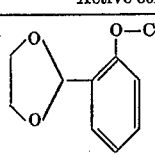 | 0.2<br>0.04 | 100<br>100 |
| (2) 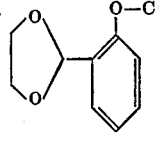 | 0.2<br>0.04 | 100<br>100 |
| (A) 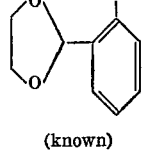<br>(known) | 0.2<br>0.04 | 100<br>0 |
| (B) 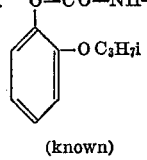<br>(known) | 0.2 | 60 |

EXAMPLE 6

Residual test

Test insects: *Musca domestica* and *Aedes aegypti*
Wettable powder base consisting of:
  3% sodium diisobutylnaphthalene-1-sulfonate
  6% sulfite waste liquor, partially condensed with aniline
  40% highly dispersed silicic acid (containing CaO)
  51% colloidal kaolin.

To produce a suitable preparation of the active compound, 1 part by weight of the active compound is intimately mixed with 9 parts by weight of the wettable powder base. The spray powder thus obtained is suspended in 90 parts of water.

The suspension of the active compound is sprayed, in an amount of 1 g. of the active compound per square meter, on to substrates consisting of different materials.

The sprayed coatings are, at specific intervals of time, tested for their biological activity.

For this purpose, the test insects are placed on the treated substrates. There is put over the test insects a squat cylinder which is closed at its upper end with a wire mesh in order to prevent the insects from escaping. After the insects have spent 8 hours on the substrate, the destruction of the test insects is determined as a percentage.

The active compounds, the nature of the test substrates and the results can be seen from Table 6.

EXAMPLE 7

Drosophila test

Solvent: 3 parts by weight dimethyl formamide
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

1 cc. of the preparation of the active compound is applied with a pipette to a filter paper disc of 7 cm. diameter. The wet disc is placed in a glass vessel containing 50 vinegar flies (*Drosophila melanogaster*) and covered with a glass plate.

After the specified periods of time, the destruction is determined as a percentage: 100% means that all the flies are killed; 0% means that none of the flies are killed.

The active compounds, their concentrations, the evaluation times and the degree of destruction can be seen from Table 7.

TABLE 6
Residual test

| Active compounds | Test substrates | Test insects | Age of the residual coatings in weeks | | | | | | | |
|---|---|---|---|---|---|---|---|---|---|---|
| | | | 1 | 2 | 4 | 8 | 10 | 12 | 16 | 20 |
| | | | Destruction of the test animals as a percentage | | | | | | | |
| (1) 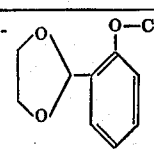 | Clay limed with Ca(OH)₂. | *Musca domestica*<br>*Aëdes aegypti* | 100<br>100 | 100<br>100 | 100<br>100 | 100<br>100 | 100<br>100 | 100<br>100 | 90<br>100 | 60<br>100 |
| (B) 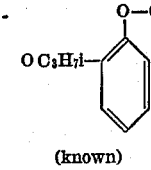<br>(known) | ....do.... | *Musca domestica*<br>*Aëdes aegypti* | 70<br>80 | 80<br>90 | 30<br>50 | <br>0 | | | | |

TABLE 7

Drosophila test
(Plant damaging insects)

| Active compounds | Concentration of active compound in percent | Degree of destruction in percent after 1 day |
|---|---|---|
| (1) 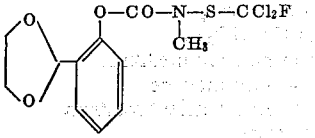 O—CO—N—S—CCl₂F, CH₃ | 0.2<br>0.02 | 100<br>90 |
| (3) 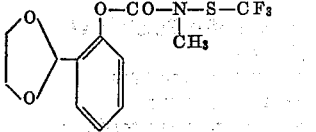 O—CO—N—S—CF₃, CH₃ | 0.2<br>0.02<br>0.002<br>0.0002 | 100<br>100<br>100<br>50 |
| (5) CH₃— 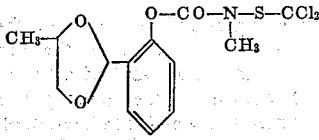 O—CO—N—S—CCl₂F, CH₃ | 0.2<br>0.02<br>0.002 | 100<br>100<br>99 |
| (A) 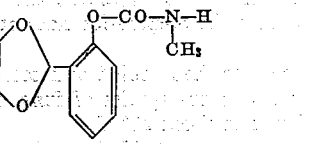 O—CO—N—H, CH₃ (known) | 0.2<br>0.02 | 100<br>20 |

EXAMPLE 8

Phaedon larvae test

Solvent: 3 parts by weight dimethyl formamide
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concenration.

Cabbage leaves (Brassica oleracea) are sprayed with the preparation of the active compound until dripping wet and then infested with mustard beetle larvae (Phaedon cochleariae).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 8:

TABLE 8

Phaedon larvae test
(Plant damaging insects)

| Active compounds | Concentration of active compound in percent | Degree of destruction in percent after 3 days |
|---|---|---|
| (1) 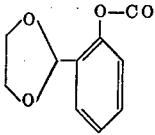 O—CO—N—S—CCl₂F, CH₃ | 0.2<br>0.02<br>0.002 | 100<br>100<br>30 |

TABLE 8—Continued

Phaedon larvae test
(Plant damaging insects)

| Active compounds | Concentration of active compound in percent | Degree of destruction in percent after 3 days |
|---|---|---|
| (2) 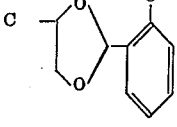 O—CO—N—S—CCl₃, CH₃ | 0.2<br>0.02<br>0.002 | 100<br>100<br>60 |
| (4) C— 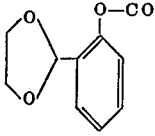 O—CO—N—S—CCl₃, CH₃ | 0.2<br>0.02<br>0.002 | 100<br>100<br>70 |
| (3) 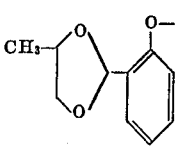 O—CO—N—S—CF₃, CH₃ | 0.2<br>0.02<br>0.002 | 100<br>100<br>100 |
| (5) CH₃— 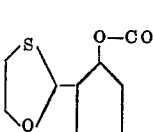 O—CO—N—S—CCl₂F, CH₃ | 0.2<br>0.02<br>0.002 | 100<br>100<br>70 |
| (6) 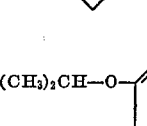 O—CO—N—SCCl₂F, CH₃ | 0.2<br>0.02 | 100<br>100 |
| (B) (CH₃)₂CH—O— 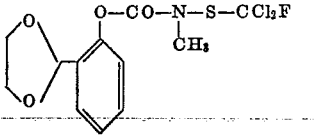 O—CO—N—H, CH₃ (known) | 0.2<br>0.02 | 100<br>20 |

EXAMPLE 9

Tetranychus test/resistant

Solvent: 3 parts by weight dimethyl formamide
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (Phaseolus vulgaris), which have a height of approximately 10–30 cm., are sprayed with the preparation of the active compound until dripping wet. These bean plants are heavily infested with spider mites (Tetranychus urticae) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 9:

TABLE 9

Tetranychus test (resistant)
(Plant damaging mites)

| Active compounds | Concentration of active compound in percent | Degree of destruction in percent after 3 days |
|---|---|---|
| (1) [dioxane-phenyl]-O—CO—N(CH$_3$)—S—CCl$_2$F | 0.2 / 0.02 | 100 / 45 |
| (3) [dioxane-phenyl]-O—CO—N(CH$_3$)—S—CF$_3$ | 0.2 / 0.02 | 100 / 30 |
| (5) CH$_3$-[dioxane-phenyl]-O—CO—N(CH$_3$)—S—CCl$_2$F | 0.2 / 0.02 | 100 / 35 |
| (6) [thio-dioxane-phenyl]-O—CO—N(CH$_3$)—S—CCl$_2$F | 0.2 | 100 |
| (A) [dioxane-phenyl]-O—CO—N(CH$_3$)—H (known) | 0.2 | 0 |
| (B) (CH$_3$)$_2$CH—O—[phenyl]-O—CO—N(CH$_3$)—H (known) | 0.2 | 0 |

EXAMPLE 10

Mycelium growth test

Nutrient medium used:
    20 parts by weight agar-agar
    200 parts by weight potato decoction
    5 parts by weight malt
    15 parts by weight dextrose
    5 parts by weight peptone
    2 parts by weight Na$_2$HPO$_4$
    0.3 part by weight Ca(NO$_3$)$_2$
Proportion of solvent to nutrient medium:
    2 parts by weight solvent mixture
    100 parts by weight agar nutrient medium
Composition solvent mixture
    0.19 part by weight DMF
    0.01 part by weight emulsifier Emulvin W
    1.80 parts by weight water
Proportion of solvent to nutrient medium:
    2 parts by weight solvent mixture
    100 parts by weight agar nutrient meduim.

The amount of active compound required for the desired concentration of active compound in the nutrient medium is mixed with the stated amount of solvent. The concentrate is thoroughly mixed in the stated proportion with the liquid nutrient medium which has been cooled to 42° C. and is then poured into Petri dishes of 9 cm. diameter. Control dishes to which the preparation has not been added are also set up.

When the nutrient medium has cooled and solidified, the dishes are inoculated with the species of fungi stated in the Table and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 = no fungus growth
1 = very strong inhibition of growth
2 = medium inhibition of growth
3 = slight inhibition of growth
4 = growth equal to that of untreated control.

The active compounds, their concentrations and the results obtained can be seen from Table 10:

TABLE 10

| Mycelium growth test—Active compounds | Concentration of active compound, p.p.m. | Fungi |||||||
|---|---|---|---|---|---|---|---|---|
| | | Piricularia oryzae | Phialophora cinerescens | Pellicularia sasakii | Mycosphaerella musicola | Verticillium alboatrum | Cochliobolus miyabeanus | Colletotrichum coffeanum |
| (1) [dioxane-phenyl]-O—CO—N(CH$_3$)—S—CCl$_2$F | 10 / 5 | 0 / 0 | 0 / 1 | 1 / 1 | 0 / 0 | 2 / 3 | 0 / 0 | 0 / 0 |
| [cyclohexene-dicarboximide-N—CCl$_3$] | 10 | 1 | 4 | 4 | 2 | 4 | 4 | 4 |

EXAMPLE 11

Piricularia test: liquid preparation of active compound

Solvent: 1.9 parts by weight DMF
Dispersing agent: 0.1 part by weight emulsifier Emulvin W
Water: 98 parts by weight water.

The amount of active compound required for the desired concentration in the spray liquor is mixed with the stated amount of solvent, and the concentrate is diluted with the stated amount of water containing the stated dispersing agent.

30 rice plants about 14 days old are sprayed with the spray liquor until dripping wet. The plants remain in a greenhouse at temperatures of 22 to 24° C., and a relative atmospheric humidity of about 70% until they are dry. They are then inoculated with an aqueous suspension of 100,000 to 200,000 spores/ml. of *Piricularia oryzae* and placed in a chamber at 24–26° C. and 100% relative atmospheric humidity.

5 days after inoculation, the infection of all the leaves present at the time of inoculation is determined as a percentage of the untreated but also inoculated control plants. 0% means no infection; 100% means that the infection is exactly as great in the case of the control plants.

The active compounds, the concentrations of the active compounds and the results can be seen from the following Table 11:

TABLE 11
Piricularia test/liquid preparation of active compound

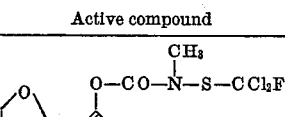

EXAMPLE 12

LT$_{100}$ test for *Diptera*

Test insects: *Musca domestica*
Solvent: acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% destruction is determined.

The test insects, the active compounds, the concentrations of the active compounds and the periods of time at which there is a 100% destruction can be seen from the following Table 12:

TABLE 12
LT$_{100}$ test for *Diptera*

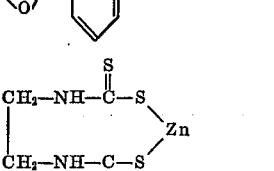

EXAMPLE 13

LT$_{100}$ test for *Diptera*

Test insects: *Aedes aegypti*
Solvent: acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100% destruction is determined.

The test insects, the active compounds, the concentrations of the active compounds and the periods of time at which there is a 100% destruction can be seen from the following Table 13:

TABLE 13

LT$_{100}$ test for *Diptera*

| Active compounds | Concentration of active compound of the solution in percent | LT$_{100}$ |
|---|---|---|
| (1) 2-(1,3-dioxolan-2-yl)phenyl N-methyl-N-(fluorodichloromethylthio)carbamate | 0.2 | 30′ |
|  | 0.04 | 30′ |
|  | 0.008 | 90′ |
|  | 0.0016 | 8$^h$=95% |
| (3) 2-(1,3-dioxolan-2-yl)phenyl N-methyl-N-(trifluoromethylthio)carbamate | 0.2 | 15′ |
|  | 0.04 | 15′ |
|  | 0.008 | 30′ |
|  | 0.0016 | 45′ |
|  | 0.00032 | 90′ |
|  | 0.000064 | 8$^h$ |
| (4) 2-(4-methyl-1,3-dioxolan-2-yl)phenyl N-methyl-N-(trichloromethylthio)carbamate | 0.2 | 45′ |
|  | 0.04 | 60′ |
|  | 0.008 | 210′ |
|  | 0.0016 | 8$^h$ |
| (5) 2-(4-methyl-1,3-dioxolan-2-yl)phenyl N-methyl-N-(fluorodichloromethylthio)carbamate | 0.2 | 30′ |
|  | 0.04 | 30′ |
|  | 0.008 | 60′ |
|  | 0.0016 | 6$^h$ |
| (A) 2-(1,3-dioxolan-2-yl)phenyl N-methylcarbamate | 0.2 | 45′ |
|  | 0.04 | 45′ |
|  | 0.008 | 8$^h$=95% |
| (known) | | |

NOTE.—In this and other tables, 8$^h$=95% means that after 8 hours there is a 95% destruction of the test animals.

EXAMPLE 14

LT$_{100}$ test

Test insects: *Tribolium confusum*
Solvent: acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed for up to 72 hours. The time which is necessary for a 100% destruction is determined.

The test insects, the active compounds, the concentrations of the active compounds and the periods of time at which there is a 100% destruction can be seen from the following Table 14:

TABLE 14

LT$_{100}$ test

| Active compounds | Concentration of active compound of the solution in percent | LT$_{100}$ |
|---|---|---|
| (2) 2-(1,3-dioxolan-2-yl)phenyl N-methyl-N-(trichloromethylthio)carbamate | 0.2 | 180′ |
|  | 0.04 | 72$^h$ |
| (1) 2-(1,3-dioxolan-2-yl)phenyl N-methyl-N-(fluorodichloromethylthio)carbamate | 0.2 | 45′ |
| (3) 2-(1,3-dioxolan-2-yl)phenyl N-methyl-N-(trifluoromethylthio)carbamate | 0.2 | 15′ |
|  | 0.04 | 60′ |
|  | 0.008 | 72$^h$ |
| (5) 2-(4-methyl-1,3-dioxolan-2-yl)phenyl N-methyl-N-(fluorodichloromethylthio)carbamate | 0.2 | 120′ |
| (4) 2-(4-methyl-1,3-dioxolan-2-yl)phenyl N-methyl-N-(trichloromethylthio)carbamate | 0.2 | 72$^h$ |
|  | 0.04 | 72$^h$ |
| (A) 2-(1,3-dioxolan-2-yl)phenyl N-methylcarbamate | 0.2 | 72$^h$ |
| (known) | | |

The following further examples are set forth to illustrate, without limitation, the process for producing the active compounds according to the present invention.

EXAMPLE 15

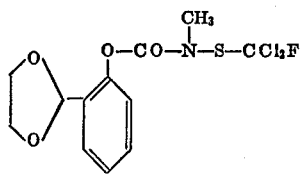

(1)

33 g. of o-(1,3-dioxolan-2-yl)-phenol (0.2 mole) and 48 g. of N - (fluorodichloromethylthio) - N - methyl-carbamic acid fluoride (0.23 mole) are dissolved in 300 ml. of dioxane. 20.5 g. of triethylamine are added dropwise to this solution at room temperature. When the weakly exothermic reaction has subsided, the mixture is stirred for 1 hour at room temperature and subsequently for 30 minutes at 60–70° C., and is cooled and poured into 700 ml. of ice water. The oil which precipitates is taken up in methylene chloride and washed with water. After drying the solution and evaporating off the methylene chloride, distillation yields 57 g. of the above compound, of boiling point 162–164° (0.13 mm. Hg) as a yellowish-colored oil which crystallizes on standing. Melting point 50–51° (petroleum ether), colorless crystals.

EXAMPLES 16–20

The following compounds are obtained analogously to Example 15:

| | | Melting point: 75–77° C. |
|---|---|---|
| (2).... | [structure: dioxane-phenyl O—CO—N(CH₃)—S—CCl₃] | Melting point: 75–77° C. |
| (3).... | [structure: dioxane-phenyl O—CO—N(CH₃)—S—CF₃] | Boiling point: 134–136° C./0.19 mm. Hg. |
| (4).... | [structure: methyl-dioxane-phenyl O—CO—N(CH₃)—S—CCl₃] | Oil, $n_D^{20}$=1.5533. |
| (5).... | [structure: methyl-dioxane-phenyl O—CO—N(CH₃)—S—CCl₂F] | Boiling point: 167–169° C./0.2 mm. Hg. |
| (6).... | [structure: thia-oxolane-phenyl O—CO—N(CH₃)—S—CCl₂F] | Boiling point: 190–193° C./0.28 mm. Hg. |

EXAMPLE 21

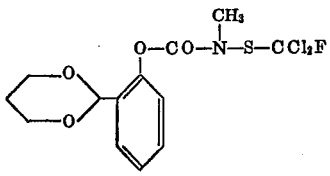

(7)

35 g. of N - (flurodichloromethylthio) - N - methyl-carbamic acid fluoride (0.165 mole), dissolved in 30 ml. of dioxane, are added dropwise, at 10–15°, to a sodium 0-(1,3-dioxan-2-yl) - phenolate solution which has been prepared from 27 g. of 0-(1,3-dioxan-2-yl)-phenol (0.15 mole), 6 g. of sodium hydroxide and 300 ml. of water. The mixture is stirred for 1 hour at room temperature, the resulting oil is taken up in methylene chloride and the organic phase is twice washed with water, dried and evaporated. The residual oil is completely freed of the solvent in a high vacuum at 70–80° C. bath temperature. 61 g. of the above compound are obtained as a yellow-brown oil which crystallizes on standing. Melting point 65–66° C. (petroleum ether).

It will be appreciated that the instant specification and examples are set forth by way of illustration and not limitation, and that various modifications and changes may be made without departing from the spirit and scope of the present invention.

What is claimed is:
1. An N-sulfenylated carbamate of the formula

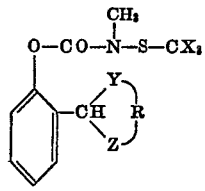

(I)

in which
X is chlorine, fluorine or bromine,
Y and Z each independently is oxygen or sulfur, and
R is ethylene, propylene or isopropylene.

2. The compound according to claim 1 wherein such compound is o-(1,3-dioxolan-2-yl) - phenyl - N - methyl-N-fluorodichloromethylthio-carbamate of the formula

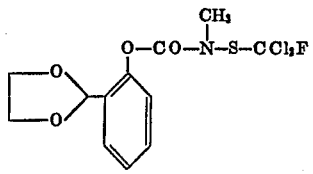

(1)

3. The compound according to claim 1 wherein such compound is o-(1,3-dioxolan-2-yl)-phenyl - N - methyl-N-trichloromethylthio-carbamate of the formula

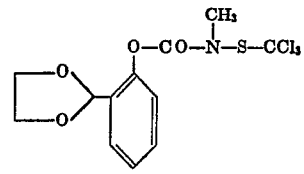

(2)

4. The compound according to claim 1 wherein such compound is o-(1,3-dioxolan-2-yl) - phenyl - N - methyl-N-trifluoromethylthio-carbamate of the formula

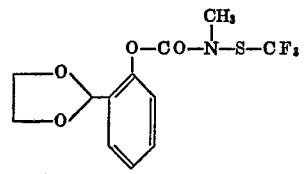

(3)

5. The compound according to claim 1 wherein such compound is o- [4-methyl-(1,3-dioxolan-2-yl)] - phenyl-N-methyl - N - trichloromethylthio-carbamate of the formula

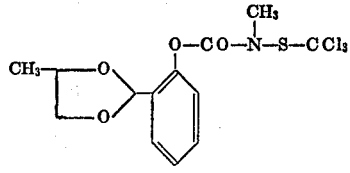

(4)

6. The compound according to claim 1 wherein such compound is o - [4-methyl-(1,3-dioxolan-2-yl)] - phenyl-N-methyl - N - fluorodichloromethylthio-carbamate of the formula

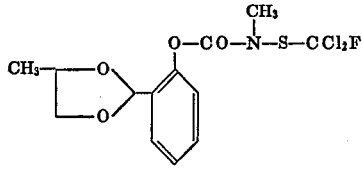

(5)

7. The compound according to claim 1 wherein such compound is o-(1,3 - thia-oxolan - 2 - yl) - phenyl - N- methyl - N - fluorodichlormethylthio-carbamate of the formula

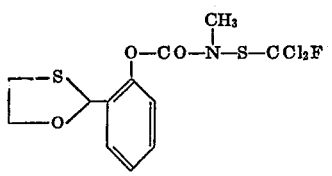

(6)

8. The compound according to claim 1 wherein such compound is o-(1,3 - dioxan - 2 - yl)-phenyl-N-methyl-N-fluorodichloromethylthio-carbamate of the formula

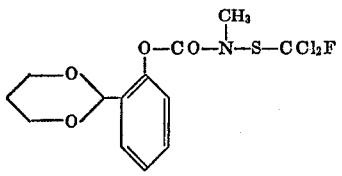

(7)

References Cited

UNITED STATES PATENTS

| | | | |
|---|---|---|---|
| 2,945,780 | 7/1960 | Jones et al. | 167—22 |
| 2,992,966 | 7/1961 | Jacobi et al. | 167—30 |
| 3,349,115 | 10/1967 | Weil | 260—479 |
| 3,651,129 | 3/1972 | Weil | 260—479 |
| 3,663,594 | 5/1972 | Brown et al. | 260—470 |

FOREIGN PATENTS

| | | | |
|---|---|---|---|
| 1,458,712 | 10/1966 | France | 260—340.9 |
| 1,922,929 | 11/1970 | Germany | 260—479 |

HENRY R. JILES, Primary Examiner

C. M. S. JAISLE, Assistant Examiner

U.S. Cl. X.R.

71—88, 90, 98; 260—338, 340.7, 340.9, 479 C; 424—273, 276, 278, 300

UNITED STATES PATENT OFFICE
CERTIFICATE OF CORRECTION

Patent No. 3,829,437  Dated August 13, 1974

Inventor(s) Gerhard Zumach et al.

It is certified that error appears in the above-identified patent and that said Letters Patent are hereby corrected as shown below:

Col. 1, in the Title, change "THRIHALO-" to -- TRIHALO- --.

Col. 1, compound (1), line 61, correct formula to read as follows:

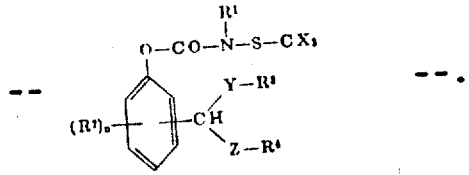

Col. 2, line 68, after "open-chain" insert -- or --.

Col. 3, line 41, correct spelling of "propanediol", first occurrence.

Col. 3, line 72, change "5-bromo" to -- 5-nitro --.

Col. 4, line 23, change "and" to -- an --.

Col. 6, line 50, correct spelling of "field".

Col. 13, line 49, correct spelling of "concentration".

Col. 14, Table 8, Compound (4), at beginning of formula, cancel "C" and substitute -- $CH_3$ --.

UNITED STATES PATENT OFFICE
CERTIFICATE OF CORRECTION

Page 2

Patent No. 3,829,437    Dated August 13, 1974

Inventor(s) Gerhard Zumach et al.

It is certified that error appears in the above-identified patent and that said Letters Patent are hereby corrected as shown below:

Col. 15, line 7, Table 9, heading of last column of Table, change "3" to -- 2 --.

Col. 16, line 22, correct spelling of "medium".

Signed and sealed this 17th day of December 1974.

(SEAL)
Attest:

McCOY M. GIBSON JR.
Attesting Officer

C. MARSHALL DANN
Commissioner of Patents